M. STROSK.
CLUTCH MECHANISM.
APPLICATION FILED SEPT. 12, 1919.

1,354,521.

Patented Oct. 5, 1920.
2 SHEETS—SHEET 1.

Inventor:
Mark Strosk.
by Wilkinson & Giusta
Attorneys.

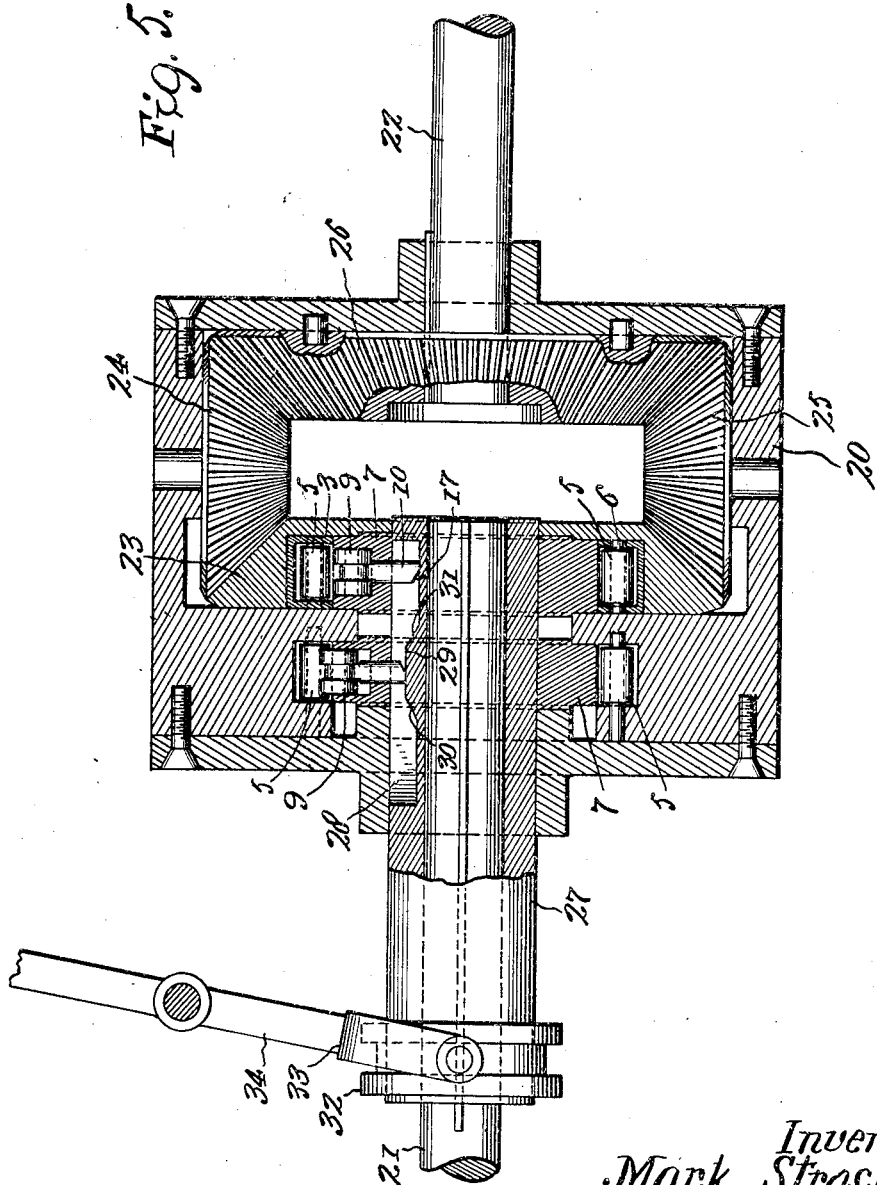

UNITED STATES PATENT OFFICE.

MARK STROSK, OF WASHINGTON, DISTRICT OF COLUMBIA.

CLUTCH MECHANISM.

1,354,521. Specification of Letters Patent. Patented Oct. 5, 1920.

Application filed September 12, 1919. Serial No. 323,260.

*To all whom it may concern:*

Be it known that I, MARK STROSK, a citizen of the United States, residing at Washington, in the District of Columbia, have invented certain new and useful Improvements in Clutch Mechanism; and I do hereby declare the following to be a full, clear, and exact description of the invention, such as will enable others skilled in the art to which it appertains to make and use the same.

The present invention relates to improvements in clutch mechanism, and has for an object to provide an improved mechanism useful wherever clutches, brakes, or the like devices are required.

Another object of the present invention lies in providing an improved clutch mechanism which will be noiseless in operation when engaging or disengaging without stopping the engine or moving element, of great strength and durability, and wherein the parts are so provided and arranged as to reduce all friction to a minimum.

In the accompanying drawings forming a part of this application, and in which similar reference symbols indicate corresponding parts in the several views:

Fig. 5 is a longitudinal sectional view taken through a marine reversible clutch transmission mechanism, and showing an application of my improved clutch mechanism.

Figure 1:
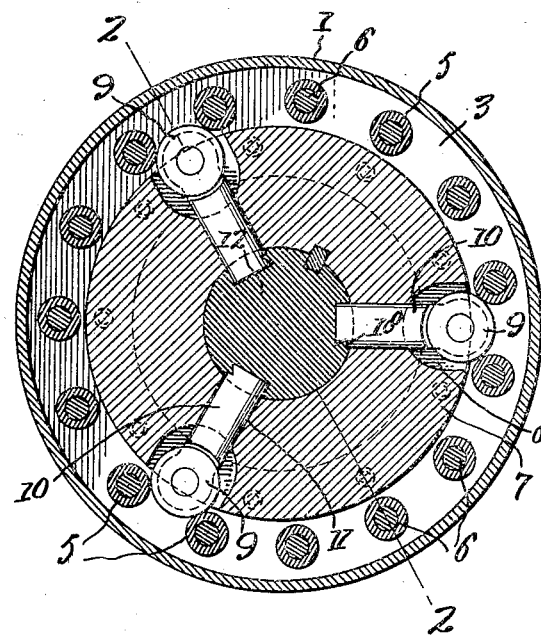
Figure 1 is a vertical central sectional view of an improved clutch mechanism constructed in accordance with my present invention.

The drawings show only one embodiment of which the present invention is susceptible, but it will be of course understood that the same is capable of construction in numerous other mechanical forms.

Referring more particularly to the drawings, one of the clutch elements is formed by a ring 1 having a pair of side flanges 2 and 3 forming a channel 4 in which are placed a circularly-arranged series of rollers 5 spaced from one another and journaled to freely rotate on pins 6 that are secured in the flanges 2 and 3. The ring 1 and its flanges 2 and 3 may be made of any suitable material, as may also the rollers 4 and pins 6, but it is preferred that the rollers be of some highly wear-resisting material, such, for instance, as steel.

The other clutch element is provided by a drum 7 having one or more pockets 8 opening out of its periphery for receiving rollers 9 that are adapted to coöperate with the rollers 5 in order to bind the elements 1 and 7 together. The rollers 9 are normally retracted within the pockets 8 in the manner shown in Figs. 3 and 4, but may be projected beyond the periphery of the drum 7 in order to cause the rollers 9 to engage between adjacent rollers 5 on the element 1 as in the manner shown in Figs. 1 and 2. Fig. 1 shows the clutch engaged, while Fig. 3 shows the same disconnected.

The pairs of rollers 9, carried by the drum 7, are preferably three in number, as this arrangement makes for a more balanced structure, and such rollers 9 are preferably enlarged with respect to the rollers 5. For the purpose of reciprocating the rollers 9 the same are mounted on arms 10 which are slidable in radial passages 11 made in the drum 7 and communicating with the pockets 8. The drum 7 also has a central opening which is in connection with the inner ends of all of the passages 11, and into which slidably fits a shaft 12 having slots 13 made to receive the inner ends of the arms 10.

Figure 2:
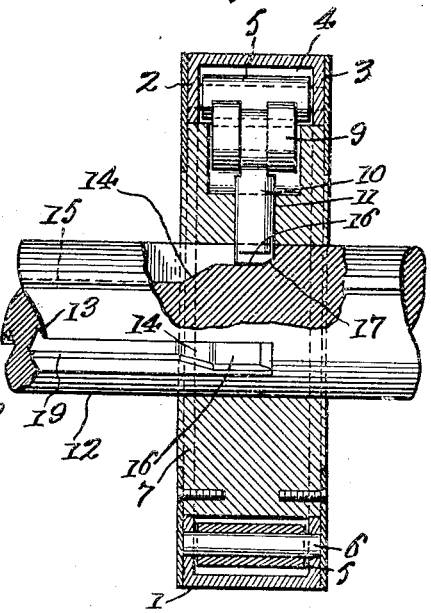
Fig. 2 is a sectional view taken on the line 2—2 in Fig. 1.
Figure 4:
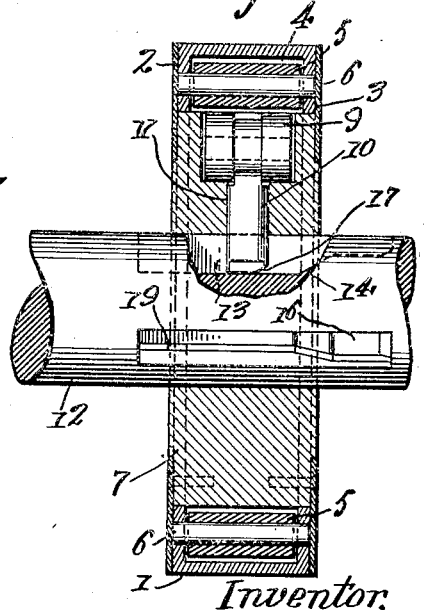
Fig. 4 is a transverse sectional view taken on the line 4—4 in Fig. 3.

As shown in Figs. 2 and 4, the slots or grooves 13 are made with inclined portions 14 leading up from the bases 15 of the slots to an elevated or stepped part 16. The arms 10 have beveled edges 17 for riding against the inclined portions 14 when the shaft 12 is drawn toward the left.

Figure 3:
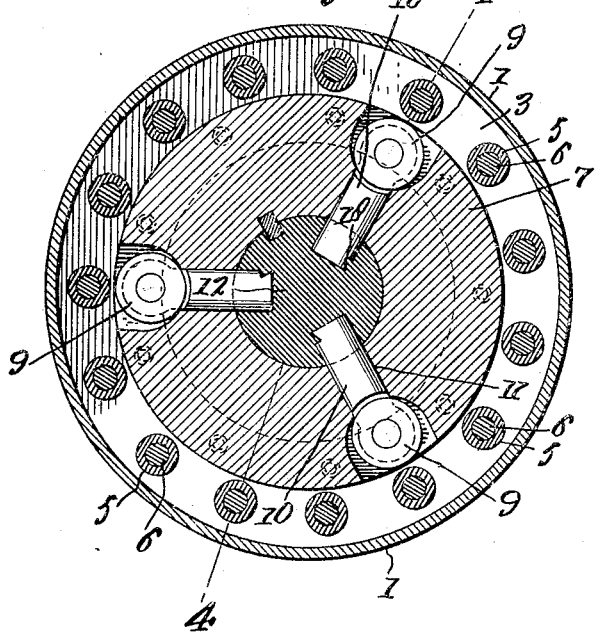
Fig. 3 is a view similar to Fig. 1, but showing the parts of the clutch disengaged.

In operation the arms 10 normally have their inner ends resting in the bases 15 of the grooves or slots 13, as shown in Figs. 3 and 4, in which condition the rollers 9 lie within the pockets 8 and do not engage the companion rollers 5 on the outer clutch element 1. In this condition the clutch is disengaged. To engage the clutch, the shaft 12 is slid longitudinally through the drum 7 toward the left, as shown in the drawings, causing the inclined portion 14 to be carried into engagement with the inner ends of the arms 10, whereby such arms are projected radially outward together with the rollers 9, which are thus caused to engage between two adjacent rollers 5 on the outer clutch element and bind the elements 1 and 7 to rotate together.

The connected condition of the clutch is shown in Figs. 1 and 2, and in Fig. 2 the arm therein shown appears as raised on the stepped part 16, which may be depressed slightly to form a partial lock for preventing the accidental movement of the shaft 12 or the escape of the arms from the stepped portion 16.

The arms 10 are also preferably grooved or notched as indicated at 18, which notches or grooves are preferably formed in the sides thereof close to their inner ends, and fitting in such notches 18 of the arms 10 is a rib 19 on the shaft 12 which projects into the groove or slot 13. The rib 19 engaging in the notch 18 firmly holds the arms 10 and causes the same to be drawn inwardly when the shaft is shifted from the position shown in Fig. 2 to that shown in Fig. 1.

It will of course be understood that the improved clutch mechanism as above described and illustrated in Figs. 1 to 4 above referred to, may have numerous applications and may be used wherever a clutch or brake mechanism is desired. One advantageous use of the device is shown in Fig. 5 in connection with a reversible marine transmission, in which 20 indicates the transmission case, 21 the drive and 22 the propeller shafts.

The propeller shaft 22 carries a beveled gear wheel 26 meshing with pinions 24 and 25 carried by the case 20, and the transmission shaft 21 also carries a beveled gear wheel 23 likewise meshing with the pinions 24 and 25 and arranged opposite to the beveled gear wheel 26. This arrangement of gear wheels and pinions is the well known form of such apparatus.

My improved clutch mechanism may be used in connection with a reversible clutch by mounting the same between the beveled gear wheel 23 and drive shaft 21. Accordingly the outer clutch element 1 which carries the rollers 5 is secured in any desired manner to the gear wheel 23, while the drum 7 is secured to a sleeve 27 which is slidably mounted on the shaft 21, yet is caused to turn therewith as by a longitudinal spline. The sleeve 27 is also capable of axial sliding through the drum 7, but is arranged to cause the drum to rotate therewith.

A second clutch is arranged to the left of the clutch which engages the gear wheel 23 and is arranged to couple the drum 20 to the drive shaft 21. This latter clutch is for the purpose of going ahead. The sleeve 27 is provided with a groove or slot 28 having substantially centrally thereof a high spot or stepped portion 29, at opposite ends of which are the inclined portions 30 and 31. The arms of the respective clutches are beveled to correspond with the inclined portions 30 and 31, and the latter are intended to be shifted with the sleeve 27 so as to alternately engage the arms 10 of either the clutch which is within the drum 20 or that within the gear wheel 23, accordingly as a forward or reverse driving is desired.

In Fig. 5 the stepped portion 29 is shown as engaging beneath the arms 10 of the clutch that engages the drum 20, while the arms of the clutch within the gear 23 rest on the base of the slot and the rollers 9 are in the inner position so that this clutch is not engaged.

The sleeve 27 extends exterior of the transmission case 20, and is provided with a channeled collar 32 in which engages a fork 33 on the end of a lever 34, by which the sleeve 27 may be shifted back and forth to drive the propeller either forward or reverse.

The use of rollers in the clutch mechanism avoids friction as much as possible, and makes the device noiseless in operation when engaging or disengaging. With the rollers also great holding power and durability can be obtained, and by having the rollers 9 enlarged over the rollers 5 and fitting only slightly therebetween, as shown in Fig. 1, no injurious binding can occur between the parts, but the rollers 9 will free themselves quickly and without noise or possibility of injury from the rollers 5 when the clutch is to be connected or disconnected.

The arrangement of the reversible transmission is such that the clutch will enable the reversal of the propeller at the same number of revolutions as the same is driven forwardly.

It is obvious that those skilled in the art may vary the details of construction and arrangements of parts without departing from the spirit of my invention, and therefore I do not wish to be limited to such features except as may be required by the claims.

I claim:

1. An improved clutch mechanism including two relatively movable clutch elements, smooth cylindrical rollers carried by said elements, the rollers on one of the elements being movable into and out of engagement with the rollers on the other of said elements, and means for causing the engagement and disengagement of said rollers whereby the clutch elements may be locked together or disconnected, substantially as described.

2. An improved clutch mechanism including two relatively movable clutch elements, smooth cylindrical rollers carried by one of said clutch elements, smaller rollers also carried by said second clutch element and movable to project into the space between the rollers of the first mentioned element for binding the two elements together, and means whereby such movable rollers may be shifted into and out of engagement with the first mentioned rollers, substantially as described.

3. An improved clutch mechanism including two relatively movable elements, a circumferential series of rollers spaced from each other carried by one of said elements, a roller carried by the other of said elements and movable into and out of engagement with the rollers on the first mentioned element, and means for moving said last mentioned roller, substantially as described.

4. An improved clutch mechanism including inner and outer rotatable clutch elements, a series of circumferentially arranged rollers on the outer element, radially movable rollers on the inner element adapted to be projected into engagement with the outer series of rollers, and means for moving said last mentioned rollers back and forth, substantially as described.

5. An improved clutch mechanism including an outer element, a circumferential series of placed apart rollers carried by said outer element, an inner element, radially movable rollers carried by said inner element and adapted to be projected against an adjacent pair of rollers on the outer element, said radially movable rollers being enlarged with respect to the outer rollers, and means for moving said inner rollers radially, substantially as described.

6. An improved clutch mechanism including an outer member, a series of circumferentially arranged rollers on said outer member, an inner member, radially movable rollers on said inner member adapted to engage the rollers on said outer member for binding said members together, arms connected to said radially movable rollers, and a part for shifting said arms and rollers having a groove therein with an inclined portion adapted to strike the arms, substantially as described.

7. An improved clutch mechanism including an outer ring having side flanges forming a trough, rollers secured in said trough and placed apart circumferentially, a drum adapted to rotate independently of and within said ring, said drum having pockets opening out on its periphery and radial passages communicating with the pockets, rollers adapted to lie in said pockets and arranged to move radially into engagement with the first named rollers, arms connected to said radially movable rollers and operating in the passages in said drum, said arms having notches in the sides thereof, and a member movable axially through said drum and having means to receive the inner ends of said arms and ribs projecting into said slots for engaging the notches in said arms, said slots having lower base portions, inclined portions for guiding the arms outwardly, and stepped portions for holding the arms and the rollers in the radially projected position, substantially as described.

MARK STROSK.